US011912547B2

(12) United States Patent
Wells et al.

(10) Patent No.: US 11,912,547 B2
(45) Date of Patent: Feb. 27, 2024

(54) VEHICLE-POWERED DEVICE TO CHANGE VEHICLE POSITION

(71) Applicant: GM Global Technology Operations LLC, Detroit, MI (US)

(72) Inventors: James W. Wells, Rochester Hills, MI (US); Michael R. Kaphengst, Leonard, MI (US); Alfred Manser, White Lake, MI (US); Barry L. Farmer, Imlay City, MI (US); Seog-Chan Oh, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 199 days.

(21) Appl. No.: 17/587,078

(22) Filed: Jan. 28, 2022

(65) Prior Publication Data

US 2023/0242384 A1 Aug. 3, 2023

(51) Int. Cl.
*B66F 7/24* (2006.01)
*B66F 7/06* (2006.01)

(52) U.S. Cl.
CPC .............. *B66F 7/0666* (2013.01); *B66F 7/24* (2013.01); *Y10S 254/09* (2013.01)

(58) Field of Classification Search
CPC .. B66F 7/24; B66F 7/0666; B66F 7/22; B66F 7/0625; B66F 7/08; Y10S 254/07; Y10S 254/09
USPC ..................................... 187/212; 254/DIG. 7
See application file for complete search history.

(56) References Cited

U.S. PATENT DOCUMENTS

| | | | | | |
|---|---|---|---|---|---|
| 1,751,874 | A * | 3/1930 | Moore | B66F 7/24 | 187/217 |
| 2,358,501 | A * | 9/1944 | Frova | B66F 7/24 | 187/244 |
| 2,497,472 | A * | 2/1950 | Sims | B60K 25/08 | 254/133 R |
| 2,538,517 | A * | 1/1951 | Hayden | B66F 7/24 | 414/233 |
| 2,579,688 | A * | 12/1951 | McCormick | B66F 7/24 | 187/217 |
| 2,754,933 | A * | 7/1956 | Gallay | B66F 7/24 | 187/212 |

(Continued)

FOREIGN PATENT DOCUMENTS

| | | | |
|---|---|---|---|
| DE | 299 04 495 | * | 3/1999 |
| DE | 299 04 495 U1 | * | 3/1999 |

OTHER PUBLICATIONS

Vehicle-Powered Elevated Parking System; Kim Nam Chae (Year: 1992).*

*Primary Examiner* — Mahdi H Nejad
(74) *Attorney, Agent, or Firm* — CANTOR COLBURN LLP

(57) ABSTRACT

A system includes a platform to support a vehicle on a first side of the platform and a passive motion device arranged on a second side of the platform, opposite the first side, to move upon actuation. A mechanical actuator actuates the passive motion device based on movement of one or more wheels of the vehicle to change a position of the vehicle. The position of the vehicle relative to the platform is unchanged and the passive motion device is actuated by only the movement of the one or more wheels of the vehicle to change the position of the vehicle.

14 Claims, 6 Drawing Sheets

(56) References Cited

U.S. PATENT DOCUMENTS

| | | | | | |
|---|---|---|---|---|---|
| 4,636,176 | A * | 1/1987 | Capilla | F02B 61/02 | 180/53.6 |
| 7,954,602 | B2 * | 6/2011 | Stanislao | B66B 9/0853 | 414/921 |

* cited by examiner

VEHICLE-POWERED DEVICE TO CHANGE VEHICLE POSITION

INTRODUCTION

The subject disclosure relates to a vehicle-powered device to change a vehicle position.

In certain setting, vehicles (e.g., automobiles, trucks, construction equipment, farm equipment) must be moved between two or more stations. In a vehicle assembly plant, for example, each vehicle is moved to different stations for installation of different parts. A moving conveyor-type system requires external power to transport vehicles to the different stations. Accordingly, it is desirable to provide a vehicle-powered device to change the vehicle position.

SUMMARY

In one exemplary embodiment, a system includes a platform to support a vehicle on a first side of the platform and a passive motion device arranged on a second side of the platform, opposite the first side, to move upon actuation. A mechanical actuator actuates the passive motion device based on movement of one or more wheels of the vehicle to change a position of the vehicle. The position of the vehicle relative to the platform is unchanged and the passive motion device is actuated by only the movement of the one or more wheels of the vehicle to change the position of the vehicle.

In addition to one or more of the features described herein, the system also includes one or more interlocks to restrain the vehicle on the platform during the change of the position of the vehicle.

In addition to one or more of the features described herein, the mechanical actuator includes one or more pairs of rollers on the first side of the platform to be rotated based on rotation of corresponding one or more wheels of the vehicle.

In addition to one or more of the features described herein, the mechanical actuator includes one or more belts to rotate based on rotation of corresponding ones of the one or more pairs of rollers.

In addition to one or more of the features described herein, the passive motion device includes a set of rollers to rotate the vehicle based on the rotation of one or more of the one or more belts.

In addition to one or more of the features described herein, the mechanical actuator includes two or more belts, and the passive motion device includes a scissor lift to lift the vehicle based on the rotation of one or more of the two or more belts.

In addition to one or more of the features described herein, the passive motion device includes a scissor lift to lift the vehicle based on rotation of one or more of the one or more belts.

In addition to one or more of the features described herein, the passive motion device includes a scissor lift, the mechanical actuator includes two or more belts to couple to two or more different locations of the scissor lift, and the passive motion device lifts and tilts the vehicle.

In addition to one or more of the features described herein, the passive motion device includes two or more wheels to translate the vehicle.

In addition to one or more of the features described herein, the system also includes a return mechanism to return the passive motion device to a different location following an exit of the vehicle from the platform than an initial location when the vehicle entered the platform.

In another exemplary embodiment, a method of assembling a system includes arranging a platform to support a vehicle on a first side of the platform and arranging a passive motion device on a second side of the platform, opposite the first side, to move upon actuation. The method also includes configuring a mechanical actuator to actuate the passive motion device based on movement of one or more wheels of the vehicle to change a position of the vehicle. The position of the vehicle relative to the platform is unchanged and the passive motion device is actuated by only the movement of the one or more wheels of the vehicle to change the position of the vehicle.

In addition to one or more of the features described herein, the method also includes arranging one or more interlocks to restrain the vehicle on the platform during the change of the position of the vehicle.

In addition to one or more of the features described herein, the configuring the mechanical actuator includes arranging one or more pairs of rollers on the first side of the platform to be rotated based on rotation of corresponding one or more wheels of the vehicle.

In addition to one or more of the features described herein, the configuring the mechanical actuator includes coupling one or more belts to rotate based on rotation of corresponding ones of the one or more pairs of rollers.

In addition to one or more of the features described herein, the arranging the passive motion device includes arranging a set of rollers to rotate the vehicle based on the rotation of one or more of the one or more belts.

In addition to one or more of the features described herein, the configuring the mechanical actuator includes arranging two or more belts, and the arranging the passive motion device includes positioning a scissor lift to lift the vehicle based on the rotation of one or more of the two or more belts.

In addition to one or more of the features described herein, the arranging the passive motion device includes arranging a scissor lift to lift the vehicle based on rotation of one or more of the one or more belts.

In addition to one or more of the features described herein, the arranging the passive motion device includes arranging a scissor lift, the configuring the mechanical actuator includes arranging two or more belts to couple to two or more different locations of the scissor lift, and the arranging the passive motion device includes the passive motion device lifting and tilting the vehicle.

In addition to one or more of the features described herein, the arranging the passive motion device includes arranging two or more wheels to translate the vehicle.

In addition to one or more of the features described herein, the method also includes arranging a return mechanism to return the passive motion device to a different location following an exit of the vehicle from the platform than an initial location when the vehicle entered the platform.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
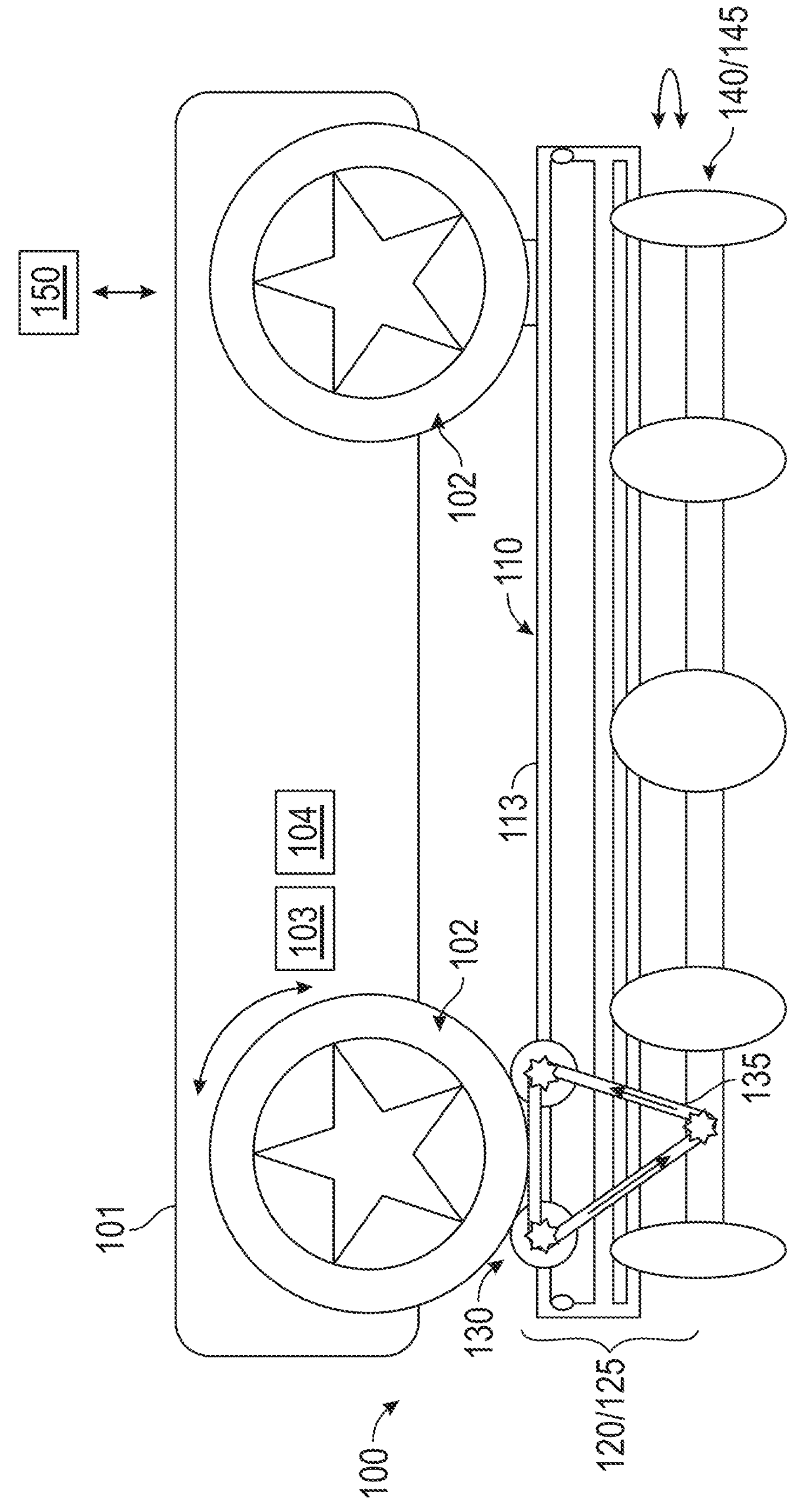
FIG. 1 shows an exemplary vehicle-powered device to rotate a vehicle according to one or more embodiments.

The following description is merely exemplary in nature and is not intended to limit the present disclosure, its application or uses. It should be understood that throughout the drawings, corresponding reference numerals indicate like or corresponding parts and features.

As previously noted, vehicles must be moved between different stations in certain environments. Prior approaches to transporting the vehicles between locations within a facility have involved conveyor belts or other mechanisms that require power. Embodiments of the systems and methods detailed herein relate to a vehicle-powered device to change a vehicle position. When the vehicle is electric rather than gas-powered, the vehicle may move itself. In a vehicle assembly environment, for example, once the chassis and powertrain have been assembled, the chassis may be moved to different locations, using its own vehicle battery, for subsequent installation of seats and other parts. However, while this approach avoids the need for an externally powered conveyer system, the turning radius of the vehicle can become a limiting factor in the space needed within the facility.

By using one or more passive devices (i.e., devices that do not require external power) to rotate, lift, tilt, translate, or otherwise change a position of the vehicle based on motion of one or more of the vehicle wheels, both space and power usage may be improved according to one or more embodiments. The vehicle may drive among different passive (vehicle-powered) devices in order to navigate tight turns, be raised for more ergonomic positioning, or perform other maneuvers that are not possible or would require too much space to perform with the vehicle movement alone. As detailed, each passive device generally includes a platform that supports the vehicle, a passive motion device that moves based on movement of one or more wheels of the vehicle, and a mechanical actuator that connects the platform to the passive motion device such that movement of one or more wheels of the vehicle is translated to movement of the passive motion device. In addition to an assembly plant, one of more of the passive, vehicle-powered devices may be used in a parking garage, auto repair shop, charging station, carwash, or other facility in which a vehicle may need to be moved. To be clear, vehicle-powered refers to the fact that the devices do not require external power and are actuated (i.e., moved) only by movement (e.g., rotation) of one or more wheels of the vehicle.

In accordance with an exemplary embodiment, FIG. 1 shows a vehicle-powered device 100 to change a position of the vehicle 101. Specifically, the exemplary vehicle-powered device 100 shown in FIG. 1 rotates the vehicle 101. The vehicle 101 may be a complete vehicle 101 in a parking garage, repair shop, car washing station, or the like, or may be a powered rolling chassis in the process of being assembled in a vehicle assembly plant, for example. The vehicle-powered device 100 shown in FIG. 1 may be used to turn the vehicle 101 in a smaller area than is required according to the turning radius of the vehicle 101.

The vehicle 101 is shown with two wheels 102 visible and is shown to include one or more sensors 103 and a vehicle controller 104. The vehicle 101 and, specifically, the vehicle controller 104 may perform wireless communication with a controller 150 to obtain routing instructions. Information from one or more sensors 103 (e.g., radar system, camera, lidar system, proximity sensor) may be used by the vehicle 104 to navigate the route provided by the controller 150. For example, the controller 150 may be in an assembly plant and may facilitate fly-by-wire type automated operation by the vehicle 101.

The controller 150 may route the vehicle 101 onto the vehicle-powered device 100 and may also direct the vehicle 101 to rotate the wheels 102 in the direction necessary to rotate the vehicle 101 as needed. The direction, acceleration speed, and angular position of the wheels 102, as well as which wheels 102 rotate, may be directed by the controller 150 and controlled by vehicle controller 104. For each of the exemplary embodiments shown in FIGS. 1-7, the rotation, speed, and angular displacement of certain wheels 102 may affect the motion and speed of motion of the vehicle-powered device 100 in a different way. The controller 150 and the vehicle controller 104 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. While the vehicle controller 104 and controller 150 are not explicitly shown for each embodiment, a vehicle 101 driving each vehicle-powered device 100, according to each embodiment, may include a vehicle controller 104 and communicate with a controller 150.

The vehicle-powered device 100 includes a platform 110 that supports the vehicle 101 on a first side 113 or surface. Generally, on the opposite side of the platform 110, a mechanical actuator 120 actuates a passive motion device 140 based on movement of one or more wheels 102 of the vehicle 101. In the exemplary case shown in FIG. 1, the mechanical actuator 120 is a roller belt conveyer 125 that includes two rollers 130 and a belt 135, and the passive motion device 140 includes a set of rollers 145. In alternate embodiments, the mechanical actuator 120 may include a chain, drive shaft, or hydraulics, for example.

As shown, when a wheel 102 of the vehicle 101 is positioned between the two rollers 130 of the mechanical actuator 120, movement of the wheel 102 results in the belt 135 actuating the passive motion device 140 (i.e., turning a rod that supports the set of rollers 145). The actuation results in the set of rollers 145 rolling and causing rotation of the vehicle-powered device 100. The direction of rotation of the wheel 102 controls the direction of rotation of the vehicle-powered device 100. The controller 150 may indicate the direction of rotation and speed in addition to providing routing information. Reflectors or other references that are detected by one or more sensors 104 (or by a driver) may facilitate accurate positioning via the mechanical actuator 120 and passive motion device 140.

While the exemplary illustration is of one wheel 102 between the two rollers 130, another pair of rollers 130 may be included in the mechanical actuator 120 and a second wheel 102 of the vehicle 101 may be positioned between the second pair of rollers 130. For example, in an all-wheel drive vehicle 101, both a front and rear wheel 102 may be used to drive a pair of rollers 130. As another example, the second pair of rollers 130 may be redundant, and a different front-wheel drive vehicle 101 entering the platform 110 from an opposite direction or a rear-wheel drive vehicle 101 entering the platform 110 from the same direction may use the second pair of rollers 130 instead of, rather than additional to, the first pair of rollers 130 to operate the passive motion device 140.

Figure 2:
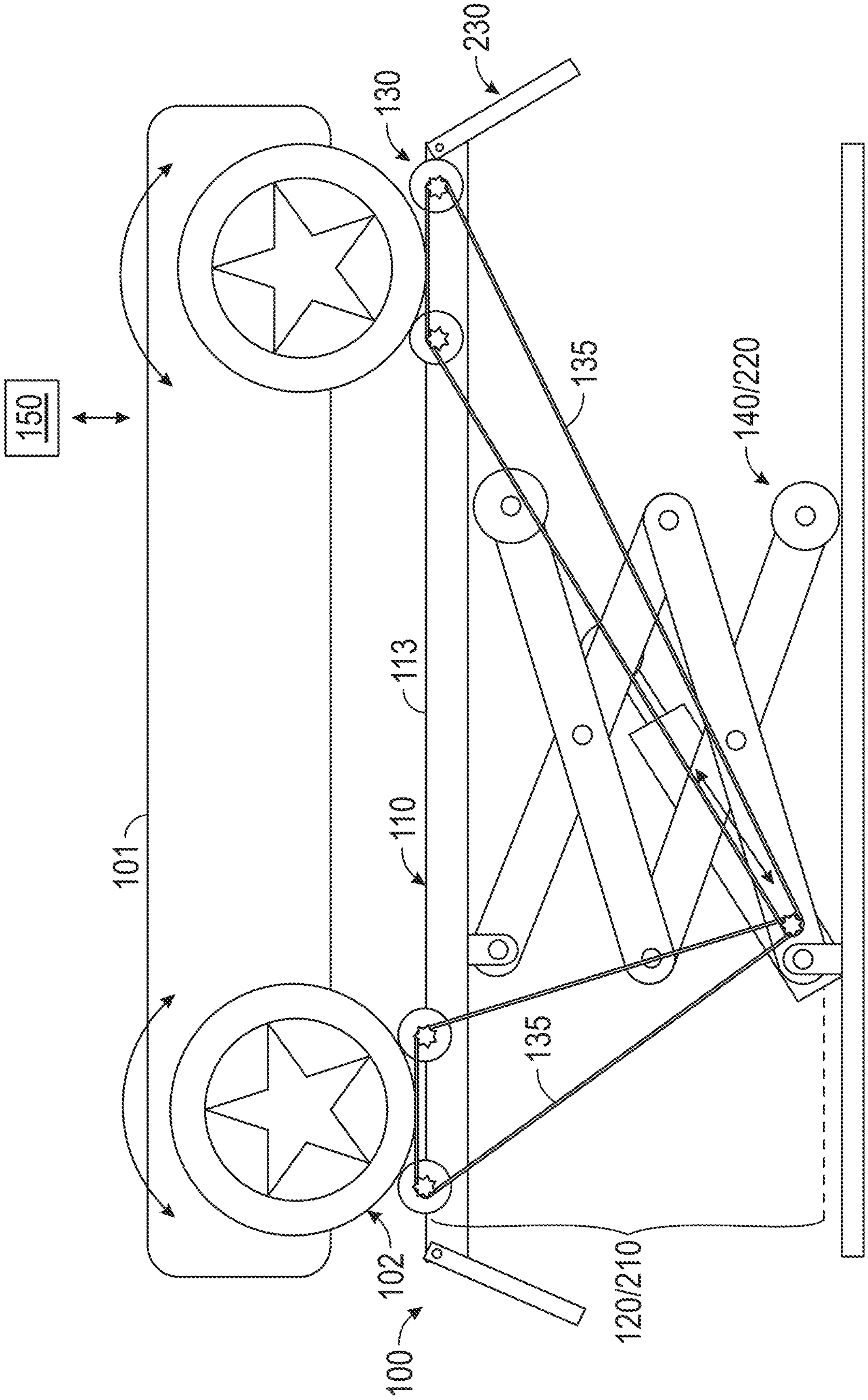
FIG. 2 shows an exemplary vehicle-powered device to lift a vehicle according to one or more embodiments.

FIG. 2 shows a vehicle-powered device 100 to change a position of the vehicle 101 according to one or more embodiments. Specifically, the exemplary vehicle-powered device 100 shown in FIG. 2 lifts the vehicle 101. In the exemplary case shown in FIG. 2, the mechanical actuator 120 is a double roller belt conveyer 210 that includes two sets of rollers 130 and two corresponding belts 135, and the passive motion device 140 includes a scissor lift 220. Based on a direction of rotation of the wheels 102, each of which engages one pair of the rollers 130, the scissor lift 220 raises or lowers the vehicle 101 that is positioned on the platform. The speed of rotation of the wheels 102, which may be controlled by the controller 104 in coordination of controller 150, translates to the speed at which the vehicle 101 is raised or lowered. As shown, the platform 110 includes interlocks 230 in the form of hinged ramps. That is, the hinged ramps may act as ramps to allow the vehicle 101 to drive onto the platform 110 and may then flip up to prevent the vehicle 101 from shifting or slipping off the platform 110 during actuation of the passive motion device 140.

Figure 3:
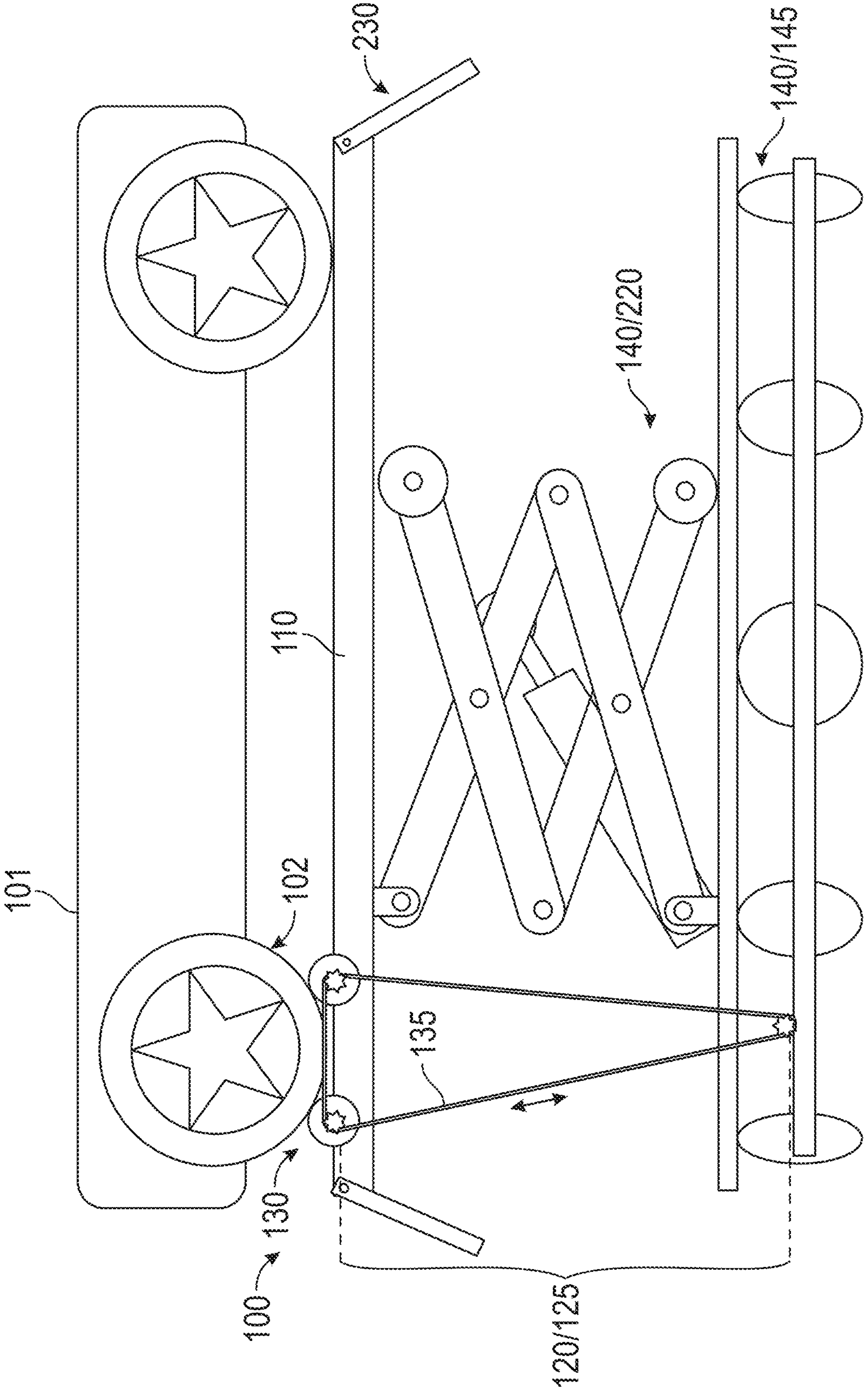
FIG. 3 shows an exemplary vehicle-powered device to lift and rotate a vehicle according to one or more embodiments.

FIG. 3 shows a vehicle-powered device 100 to change a position of the vehicle 101 according to one or more embodiments. Specifically, the exemplary vehicle-powered device 100 shown in FIG. 3 lifts and rotates the vehicle 101. One side of the vehicle 101 is shown in FIG. 3. The view on this side is similar to the illustration in FIG. 1 and shows a mechanical actuator 120 that is a roller belt conveyer 125 that includes two rollers 130 and a belt 135, and a passive motion device 140 that includes a set of rollers 145. As shown, one of the wheels 102 of the vehicle 101 is positioned to rotate the rollers 130 by its movement.

The other side of the vehicle 101 may look similar to the illustration in FIG. 2. That is, one or both wheels 102 on the other side may be positioned to drive one or more mechanical actuators 120 that cause movement of the scissor lift 220 that is shown as the second passive motion device 140 in FIG. 3. Control among the wheels 102 may be implemented by the vehicle controller 104 based on instructions from the controller 150 to determine which wheel 102 drives which mechanical actuator 120 and, thus, whether and in which direction the vehicle 101 rotates or is lifted up or lowered down. The acceleration, speed, and position of the motion may be controlled, as well. The lifting may be necessary to position the vehicle 101 in an ergonomically comfortable position for installation of seats in a vehicle assembly plant, for example, while the rotation may be necessary to correctly orient the vehicle 101 before or after that installation.

Figure 4:
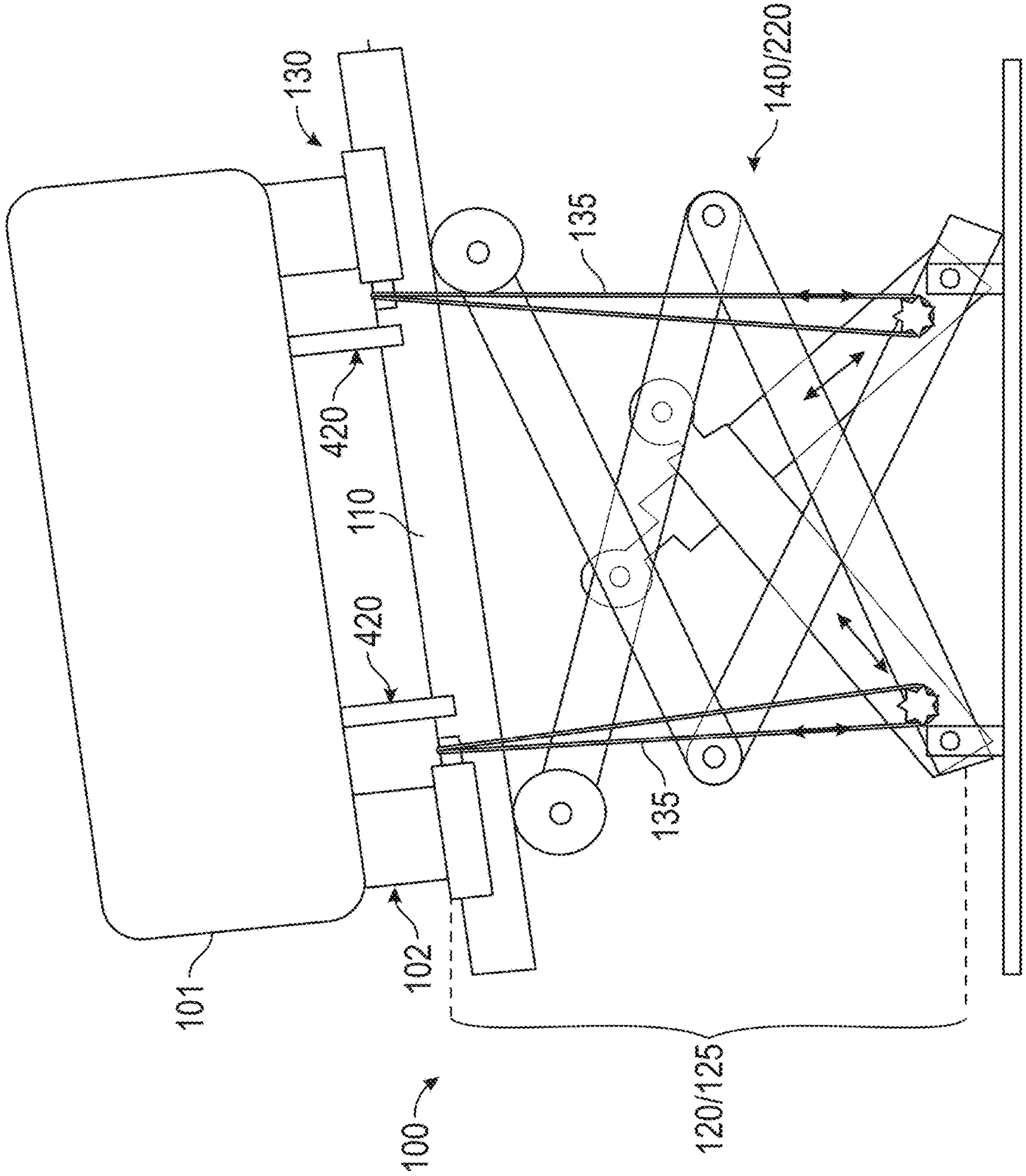
FIG. 4 shows an exemplary vehicle-powered device to lift and tilt a vehicle according to one or more embodiments.

FIG. 4 shows a vehicle-powered device 100 to change a position of the vehicle 101 according to one or more embodiments. Specifically, the exemplary vehicle-powered device 100 shown in FIG. 4 lifts and tilts the vehicle 101. Two front or two rear wheels 102 of the vehicle 101 are shown in FIG. 4 such that the orientation of the vehicle 101 in FIG. 4 differs from the orientation (i.e., one front and one rear wheel 102) shown in FIGS. 1-3. Interlocks 420, which differ in position from the interlocks 230 (e.g., hinged ramps) shown in FIG. 2, are shown on the inside of the wheels 102 extending from the platform 110. These interlocks 420 allow the vehicle 101 to drive onto the platform 110 but restrain the vehicle 101 and prevent shifting during a tilt.

The mechanical actuator 120 includes two set of rollers 130 associated with each of the two wheels 102 and two corresponding belts 135. The passive motion device 140 is a scissor lift 220. Unlike the embodiment shown in FIG. 2, for example, each belt 135 couples to a different part of the scissor lift 220. As a result, movement of each of the wheels 102 causes actuation of a different part of the scissor lift 220 and, consequently, a tilt in the platform 110 may be effectuated by spinning each of the wheels 102 at a different speed or by spinning only one of the wheels 102. The wheels 102 may be controlled by the vehicle controller 104 based on instructions from the controller 150.

Figure 5:
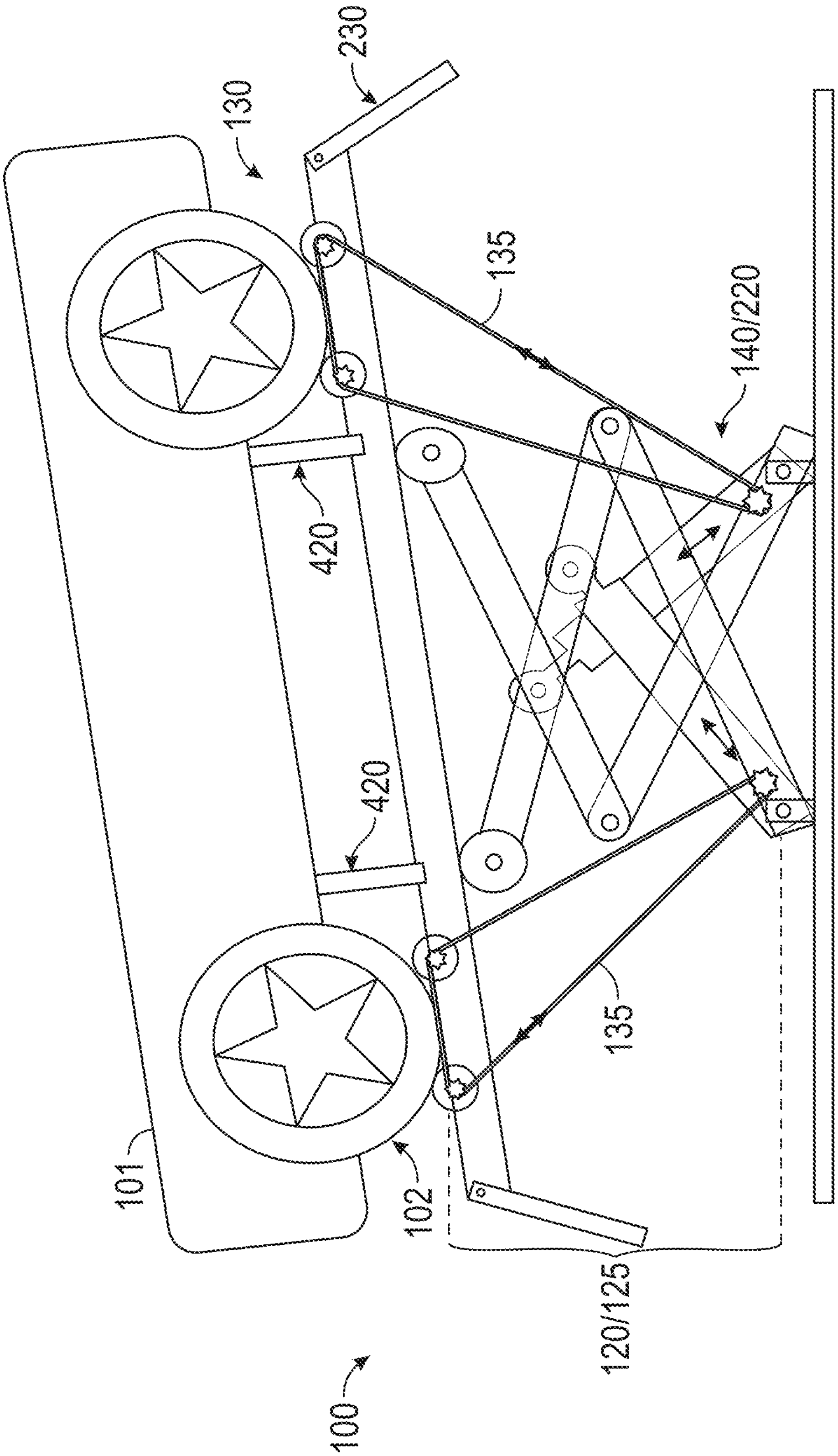
FIG. 5 shows an exemplary vehicle-powered device to lift and tilt a vehicle according to one or more embodiments.

FIG. 5 shows a vehicle-powered device 100 to change a position of the vehicle 101 according to one or more embodiments. Specifically, the exemplary vehicle-powered device 100 shown in FIG. 5 lifts and tilts the vehicle 101. Like the embodiment shown in FIG. 4, the embodiment of the vehicle-powered device 100 shown in FIG. 5 may facilitate both a lift and a tilt. This is based on each of two belts 135 of the mechanical actuator 120 coupling to two different parts of the scissor lift 220 that is the passive motion device 140 using in the embodiment. Unlike the embodiment shown in FIG. 4, the orientation of the vehicle 101 shown in FIG. 5 is similar to that shown in FIGS. 1-3. Thus, a front and a rear wheel 102 are shown controlling each set of rollers 130 of the mechanical actuator 120 according to instructions from the controller 150, for example. The embodiment shown in FIG. 5 includes both the interlocks 420 on the inside of the wheels 102 and also the interlocks 230 (e.g., hinged ramps) on the ends of the platform 110 that may also act as ramps when in the down position, as shown.

Figure 6:
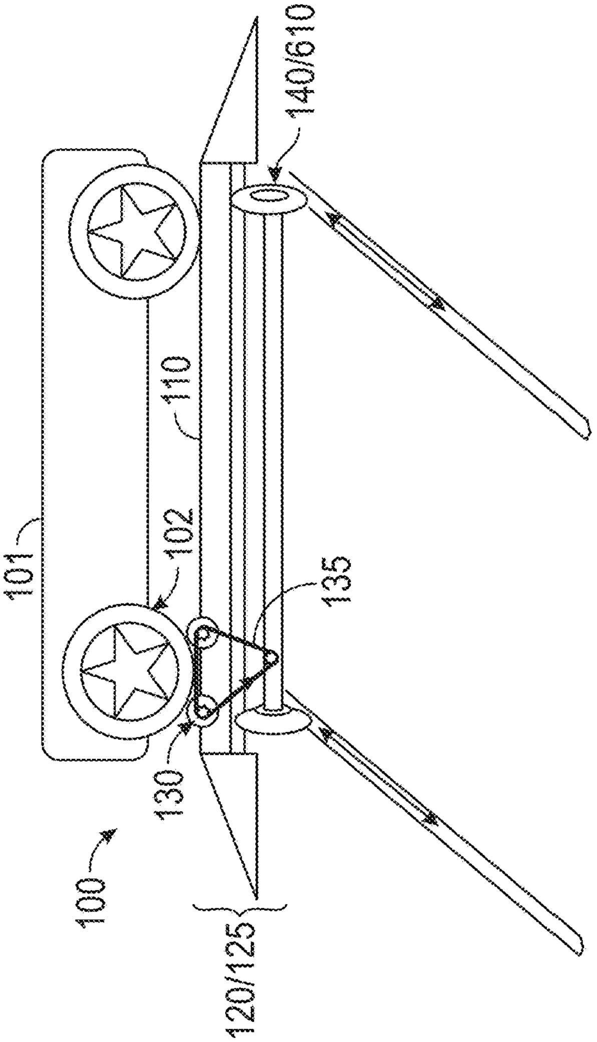
FIG. 6 shows an exemplary vehicle-powered device to translate a vehicle according to one or more embodiments.

FIG. 6 shows a vehicle-powered device 100 to change a position of the vehicle 101 according to one or more embodiments. Specifically, the exemplary vehicle-powered device 100 shown in FIG. 6 translates the vehicle 101. As shown, the mechanical actuator 120 is a roller belt conveyer 125, as described with reference to FIG. 1, for example. However, the passive motion device 140 includes wheels 610 that provide translation rather than rotation of the vehicle-powered device 100 and, thus, the vehicle 101 positioned on the platform 110 of the vehicle-powered device 100. The speed of translation may be controlled, via controller 150, for example, based on a rotational speed of the wheels 102 of the vehicle 101.

Figure 7:
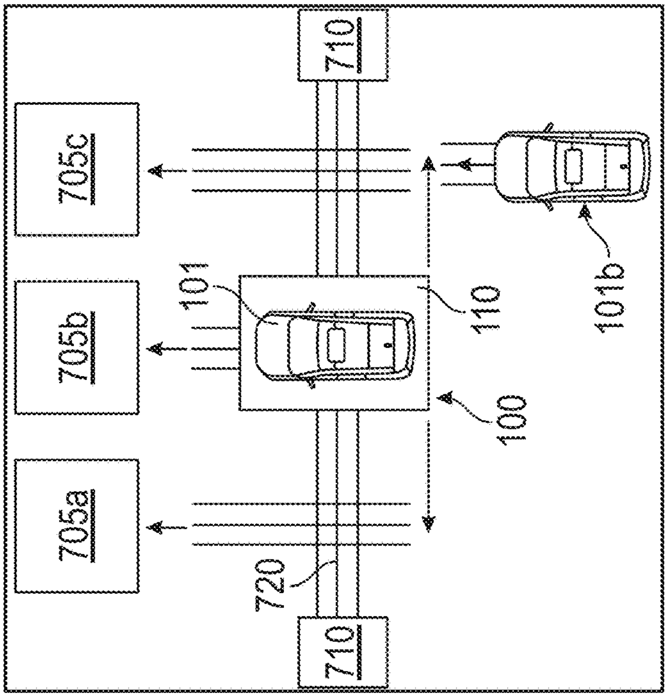
FIG. 7 illustrates a scenario including a return mechanism for the vehicle-powered device shown in FIG. 6.

FIG. 7 illustrates a scenario including a return mechanism 710 for the vehicle-powered device 100 shown in FIG. 6. As shown, a vehicle 101 is on the platform 110 of a vehicle-powered device 100, according to one or more embodiments, that translates the position of the vehicle 101 to the left or right, according to the orientation shown in FIG. 7. Three stations 705*a*, 705*b*, 705*c* (generally referred to as 705) are shown. These stations 705 may be different washing stations in a carwash, different parking spaces in a garage, or different assembly stations in a vehicle assembly plant, for example.

Once the vehicle 101 is positioned to drive directly into the correct station 705, the vehicle 101 may drive off the platform 110 to that station 705. For example, as shown, the vehicle 101 may drive off the platform 110 into the station 705*b*. In this case, the vehicle-powered device 100 remains in front of the station 705 (e.g., 705*b*) at which the vehicle 101 exited. However, the next vehicle 101*b* that requires translation may need to start near station 705*c*, as shown, and may require translation to station 705*a*. In this case, the position of the vehicle-powered device 100 in front of the station 705*b* is unhelpful.

Return controllers 710 are shown (optionally) on either side of the stations 705. Only one of the return controllers 710 may be present based on the mechanism 720 (e.g., spring, pulley, hydraulics) used for the repositioning of the vehicle-powered device 100. The one or more return controllers 710 may be controlled by the controller 150. While shown for the translating vehicle-powered device 100 according to the exemplary embodiment of FIG. 6, a return controller 710 and mechanism 720 may also be used with any of the vehicle-powered devices 100 discussed with reference to FIGS. 1-5.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A system for changing a position of a vehicle, the system comprising:

a platform configured to support the vehicle on a first side of the platform;

a passive motion device arranged on a second side of the platform, opposite the first side, and configured to move upon actuation; and a mechanical actuator configured to actuate the passive motion device based on movement of one or more wheels of the vehicle to change a position of the vehicle, wherein the position of the vehicle relative to the platform is unchanged and the passive motion device is actuated by only the movement of the one or more wheels of the vehicle to change the position of the vehicle;

wherein the mechanical actuator includes one or more pairs of rollers on the first side of the platform and configured to be rotated based on rotation of corresponding one or more wheels of the vehicle and the mechanical actuator includes one or more belts configured to rotate based on rotation of corresponding ones of the one or more pairs of rollers; and wherein the passive motion device includes a set of rollers configured to rotate the vehicle based on the rotation of one or more of the one or more belts.

2. The system according to claim 1, further comprising one or more interlocks configured to restrain the vehicle on the platform during the change of the position of the vehicle.

3. The system according to claim 1, wherein the mechanical actuator includes two or more belts, and the passive motion device includes a scissor lift configured to lift the vehicle based on the rotation of one or more of the two or more belts.

4. The system according to claim 1, wherein the passive motion device includes a scissor lift configured to lift the vehicle based on rotation of one or more of the one or more belts.

5. The system according to claim 1, wherein the passive motion device includes a scissor lift, the mechanical actuator includes two or more belts configured to couple to two or more different locations of the scissor lift, and the passive motion device is configured to lift and tilt the vehicle.

6. The system according to claim 1, wherein the passive motion device includes two or more wheels configured to translate the vehicle.

7. The system according to claim 6, further comprising a return mechanism configured to return the passive motion device to a different location following an exit of the vehicle from the platform than an initial location when the vehicle entered the platform.

8. A method of assembling a system for changing a position of a vehicle, the method comprising:

arranging a platform to support the vehicle on a first side of the platform;

arranging a passive motion device on a second side of the platform, opposite the first side, to move upon actuation;

configuring a mechanical actuator to actuate the passive motion device based on movement of one or more wheels of the vehicle to change a position of the vehicle, wherein the position of the vehicle relative to the platform is unchanged and the passive motion device is actuated by only the movement of the one or more wheels of the vehicle to change the position of the vehicle;

wherein the configuring the mechanical actuator includes arranging one or more pairs of rollers on the first side of the platform to be rotated based on rotation of corresponding one or more wheels of the vehicle and includes coupling one or more belts to rotate based on rotation of corresponding ones of the one or more pairs of rollers; and wherein the arranging the passive motion device includes arranging a set of rollers to rotate the vehicle based on the rotation of one or more of the one or more belts.

9. The method according to claim 8, further comprising arranging one or more interlocks to restrain the vehicle on the platform during the change of the position of the vehicle.

10. The method according to claim 8, wherein the configuring the mechanical actuator includes arranging two or more belts, and the arranging the passive motion device includes positioning a scissor lift to lift the vehicle based on the rotation of one or more of the two or more belts.

11. The method according to claim 8, wherein the arranging the passive motion device includes arranging a scissor lift to lift the vehicle based on rotation of one or more of the one or more belts.

12. The method according to claim 8, wherein the arranging the passive motion device includes arranging a scissor lift, the configuring the mechanical actuator includes arranging two or more belts to couple to two or more different locations of the scissor lift, and the arranging the passive motion device includes the passive motion device lifting and tilting the vehicle.

13. The method according to claim 8, wherein the arranging the passive motion device includes arranging two or more wheels to translate the vehicle.

14. The method according to claim 13, further comprising arranging a return mechanism to return the passive motion device to a different location following an exit of the vehicle from the platform than an initial location when the vehicle entered the platform.

* * * * *